United States Patent [19]

Wiefferink

[11] Patent Number: 5,160,975

[45] Date of Patent: Nov. 3, 1992

[54] SPECTROMETER COMPRISING A SLIT BOX

[75] Inventor: Theodorus G. L. Wiefferink, Almelo, Netherlands

[73] Assignee: U.S. Philips Corp., New York, N.Y.

[21] Appl. No.: 626,083

[22] Filed: Dec. 11, 1990

[30] Foreign Application Priority Data

Dec. 12, 1989 [NL] Netherlands ............... 8903045

[51] Int. Cl.$^5$ ............................................. G01J 3/28
[52] U.S. Cl. ......................................... 356/326; 356/328
[58] Field of Search .......................... 356/326, 328, 313

[56] References Cited

U.S. PATENT DOCUMENTS 4,259,014  4/1981  Talmi ............................. 356/328
4,340,303  7/1982  Grisar et al. .................... 356/328

Primary Examiner—F. L. Evans
Assistant Examiner—K. P. Hantis
Attorney, Agent, or Firm—William L. Botjer

[57] ABSTRACT

For exact positioning of optical elements, a spectrometer is provided with a holder which is constructed using plates having a sector of circle shape and a side wall portion comprising a cylindrical surface portion. The cylindrical surface portion is provided with an exactly circular abutment face in which an entrance slot and an exit slot are provided. Relative to this abutment face, an entrance slit and an exit slit can be extremely exactly positioned with respect to one another along an exact circle. The holder is preferably constructed using two axially stacked compartments, in a cylindrical surface portion of which the slot or slots is/are provided between the compartments.

9 Claims, 1 Drawing Sheet

SPECTROMETER COMPRISING A SLIT BOX

BACKGROUND OF THE INVENTION

The invention relates to a spectrometer, comprising a housing for optical elements, an entrance slit and an exit slit and also relates to a box which serves as a support for the entrance slit and the exit slit for such a spectrometer.

Known spectrometers are found to have a drawback in that it is difficult to satisfy the increasingly more severe requirements imposed notably as regards resolution, even when the spectrometers have a comparatively heavy and expensive construction. It has also been found that in known apparatus often location hysteresis occurs, so that, for example, intricate handling and high temperature stability are required and frequent readjustment of the apparatus is necessary.

SUMMARY OF THE INVENTION

It is an object of the invention to mitigate these drawbacks; to achieve this, a spectrometer of the kind set forth in accordance with the invention which may be comprised of a housing constructed of a single cast product and characterized in that a support for an entrance slit and an exit slit is constructed as a rigid box which has the shape of a sector of circle and which consists of plates and side walls having a sector of circle shape, including a circular-cylindrical surface portion on which an exactly circular abutment face is provided which comprises slots, wherein the box may be constructed by welding.

Because the optical elements in a spectrometer in accordance with the invention can be positioned with respect to an accurately defined, localized abutment face, a high resolution can be achieved and thermal and mechanical hysteresis can be strongly reduced; moverover, a substantial saving as regards cost can be achieved.

A preferred embodiment of the box consists of two axially stacked compartments wherebetween slots are provided in portions of a circular cylindrical wall with an exactly circular abutment face. An extremely rigid support is thus realised using simple means, which support may include a space for mounting optical auxiliaries.

In a further preferred embodiment, for example an encoded motor is mounted on the holder for tangential displacement of an entrance slit or exit slit along the abutment face. Moreover, notably a circular slot at an exit side may be subdivided into detection slits which extend transversely thereof and which are adapted to elements to be detected, i.e. wavelengths of light to be detected, said detection slits being distributed across the exit slit and being provided, for example with a respective detection element such as, for example a photomultiplier. It is alternatively possible to mount a semiconductor light detector for location-sensitive measurement of spectra on an exit slit. A detector of this kind may be constructed using a linear array of photodiodes or a linear array of CCD diodes for an auto-scanning detector.

Another preferred embodiment of the box is constructed using, for example stainless steel plates having a thickness of, for example approximately 1 mm. For a 0.5 m optical system, the sector of circle-shaped plates then have a radius of 25 cm. For the mounting of components in the box and in order to realise a saving in weight, sector of circle shaped plates may be provided with an aperture. For the mounting of further components it may be advantageous to provide the box with a collar profile by axial extension of a side wall portion. Parts of said collar profile can then serve as reference faces or mounting faces for further mounting.

BRIEF DESCRIPTION OF THE DRAWING

Some embodiments of a spectrometer and an appropriate holder will be described in detail hereinafter with reference to the drawing. Therein.

DETAILED DESCRIPTION OF ONE PREFERRED EMBODIMENT

Figure 1:
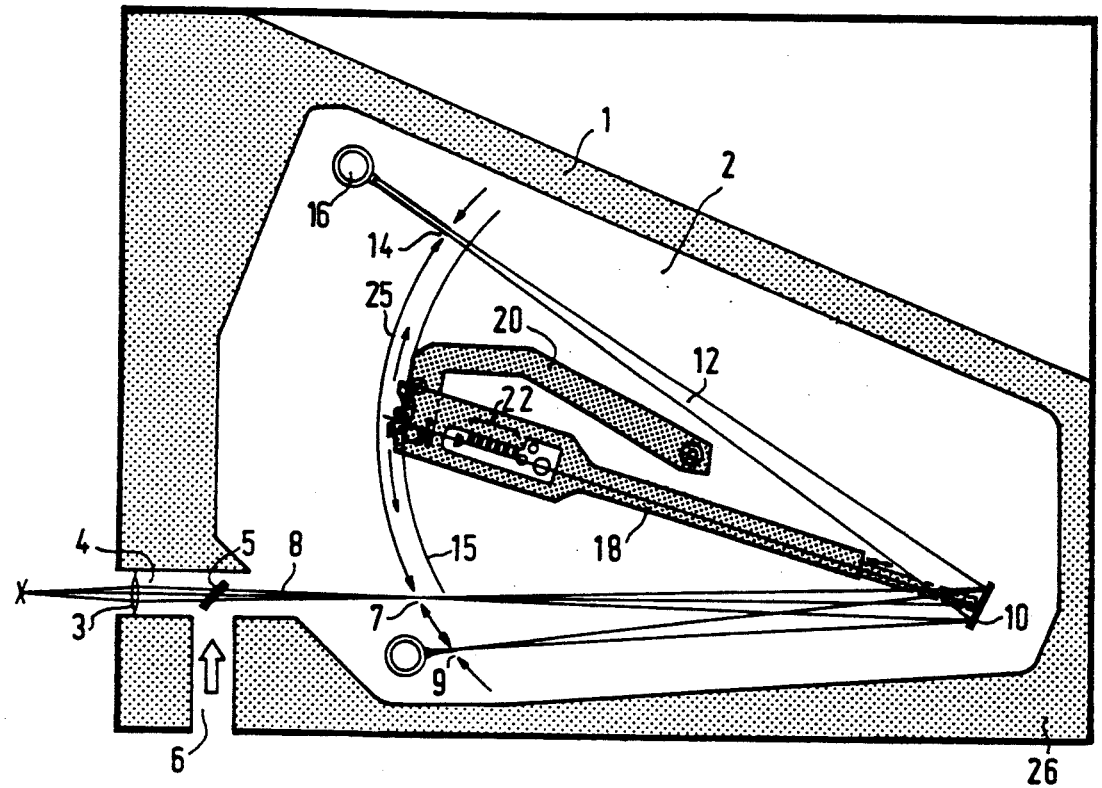
FIG. 1 diagrammatically shows a part of a spectrometer which is of relevance for the invention.

FIG. 1 shows a spectrometer which includes a holder 1 which encloses in this case a space 2 to be conditioned, an entrance duct 4 which in this case includes a lens 3, and a tiltable mirror 5 for input of an alternative light beam via a duct 6. Via an entrance slit 7, an incident light beam 8 is incident on a first grating 10 and a light beam 12 reflected thereby reaches, via a detection slit 14, a light detector 16, for example in the form of a photomultiplier. A spectrum can be recorded by tangential displacement of an entrance slit along an entrance slot in an abutment face 15 of the box. The spectrometer also includes a scanner 18 which is rotatable by means of a bracket 20 and which serves to scan a spectrum to be measured. Such a scanner may comprise an adjustable filter system 22. For the measurement of light having a comparatively long wavelength there may be provided a second grating with further detection slits.

The entrance slit 7 and the exit slit 14 are in this case included in a slit plate 25. The holder 1, the grating 10, the scanner 18 and the slit plate 25 are mounted on a supporting plate 26 which is in this case diagrammatically shown to be rectangular and which actually supports all components. Notably the positioning of the entrance slit 7, the grating 10 and the detection or exit slit 14 with respect to one another is of primary importance achieving a high resolution. Dimensional instability could occur in the support due to temperature influences, which instability will usually exhibit hysteresis. Therefore, readjustment of the optical system of the apparatus may be necessary already in the case of comparatively small temperature fluctuations.

Figure 2:
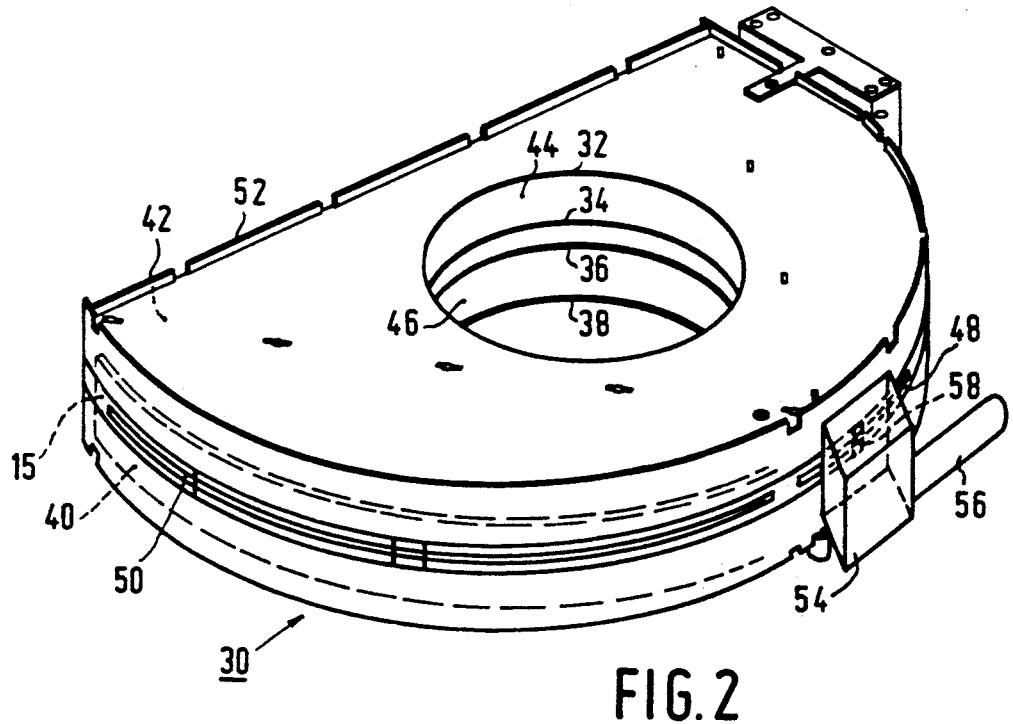
FIG. 2 shows an embodiment of an appropriate box.

A box 30 as shown in FIG. 2 is composed of four circular, in this case substantially semi-circular, plates 32, 34, 36 and 38, a cylinder envelope portion 40 and a further wall portion 42. In this case semi-circular plates enclose a sector of circle of, for example approximately 100°. The abutment face 15 for positioning an entrance slit and an exit slit is exactly circular. For a radius of 250 mm, the accuracy of the radius is, for example approximately 0.2 mm. The four sector of circle plates in this case form two compartments 44 and 46. An entrance slot 48 and an exit slot 50 are provided in the cylinder surface between the two compartments, which slots may alternatively form a single, common slot. An abutment face of the cylinder surface, extending on both sides of the slot, is formed so as to be exactly circular on an already assembled box. The box may be provided with collars 52 by way of axial raised portions. Collar portions can be used as reference faces or mounting faces. In this case an entrance slit module 54 is mounted on the entrance slot so that an exposure slit 58 can be tangentially displaced along the entrance slot by means of a preferably encoded drive motor 56. The position of the entrance slit can be detected using, for example an encoder, or a counter in the case of a step motor. Similarly, a detection slit can also be displaced along the exit slot. On the exit slot there may also be provided a location-sensitive detector, 57 for example in the form of a linear array of photodiodes. Similarly, use can be made of a linear array of auto-scanning CCD detectors.

I claim:

1. A spectrometer, comprising a housing for optical elements, an entrance slit and an exit slit, characterized in that a support for an entrance slit and an exit slit is constructed as a rigid box which has the shape of a sector of circle and which consists of plates and side walls having a sector of circle shape including a circular-cylindrical wall on which an exactly circular abutment face is provided which includes slots, the rigid box being constructed of two axially stacked compartments between which the slots are provided.

2. A spectrometer as claimed in claim 1 characterized in that the box is constructed by welding without addition of material.

3. A spectrometer as claimed in claim 1, characterized in that the box is constructed using stainless steel plates having a thickness of approximately 1 mm and plates which have a sector of circle shape and which enclose an angle of approximately 100° and have a radius of approximately 25 cm.

4. A spectrometer as claimed in claim 1, characterized in that an entrance or exit slit which is directed transversely of the slots can be displaced across the abutment face along a slot by means of a motor which is mounted in a holder and which includes an encoder.

5. A spectrometer as claimed in claim 1, characterized in that at an exit side the slot is subdivided into exit slits which extend transversely thereof and which have a radial location adapted to elements to be analysed.

6. A spectrometer as claimed in claim 1, characterized in that a location-sensitive solid state light detector is coupled to an exit side of the slot in the box.

7. A spectrometer as claimed in claim 1, characterized in that the housing consists of a single cast product.

8. A spectrometer as claimed in claim 1, characterized in that the box is constructed using circular plates and side walls, including a circular cylindrical surface provided with an exactly circular abutment face.

9. A spectrometer as claimed in claim 8, characterized in that the box comprises two axially stacked compartments, a slot in the abutment face being situated between two compartments.

* * * * *